US006741814B1

(12) United States Patent
Kosoff

(10) Patent No.: US 6,741,814 B1
(45) Date of Patent: May 25, 2004

(54) BALUN FOR COAXIAL CABLE TRANSMISSION

(75) Inventor: Joel Kosoff, Skaneateles, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/283,265

(22) Filed: Apr. 1, 1999

(51) Int. Cl.[7] ................................................ H04B 10/00

(52) U.S. Cl. ....................... 398/140; 398/173; 398/175; 398/177; 398/178; 398/147; 398/135; 398/100; 398/70; 398/71; 333/25; 333/26

(58) Field of Search ................................ 398/173, 175, 398/177, 178, 147, 135, 100, 70, 71, 140; 333/25, 26

(56) References Cited

U.S. PATENT DOCUMENTS

| | | | | | |
|---|---|---|---|---|---|
| 3,614,694 | A | * | 10/1971 | Koontz | 333/26 |
| 4,134,091 | A | * | 1/1979 | Rogers | 336/61 |
| 4,160,210 | A | * | 7/1979 | Molinari | 325/362 |
| 4,916,410 | A | | 4/1990 | Littlefield | 330/295 |
| 4,962,359 | A | | 10/1990 | Dunsmore | 324/638 |
| 5,282,072 | A | * | 1/1994 | Nazarathy et al. | 359/157 |
| 5,379,006 | A | | 1/1995 | McCorkle | 333/26 |
| 5,742,205 | A | | 4/1998 | Cowen et al. | 330/269 |
| 5,808,518 | A | | 9/1998 | McKinzie et al. | 333/26 |
| 5,880,646 | A | * | 3/1999 | Vannatta et al. | 333/26 |
| 6,111,465 | A | * | 8/2000 | Kakuta et al. | 330/276 |

OTHER PUBLICATIONS

“Ferrite Beads, Balun and Broadband Cores”, Power Conversion International, vol. 6, No. 4, pp. 44–50.
Transforming the Balun, by John S. Belrose in QST, Jun. 1991, pp. 30–33.
“Broadband Transformer Design for RF Transistor Power Amplifiers”, by Octavius Pitzalis et al., pp. 207–216.
“Transmission Line Transformers”, by Jerry Sevick.
“Baluns and Ununs” by Jerry Sevick.

* cited by examiner

*Primary Examiner*—Leslie Pascal
*Assistant Examiner*—Hanh Phan
(74) *Attorney, Agent, or Firm*—Steven R. Biren

(57) ABSTRACT

A balun is constructed from a parallel pair of lines (coaxial or bifiler) that are bent to form a U-shape including a more curved (bent) section with two ends each of which are connected to a respective less curved (straight leg) section. One or more single hole ferrite beads are threaded over each respective pair of less curved sections of the pair of lines.

5 Claims, 8 Drawing Sheets

BALUN FOR COAXIAL CABLE TRANSMISSION

FIELD OF THE INVENTION

This invention relates to the field of broadband communication signal processing such as in cable access television CATV and more specifically to the field of broadband baluns for use in line amplifiers.

BACKGROUND

A balun is a component used in radio frequency systems to transfer signals between an unbalanced transmission line and a pair of balanced transmission lines. In a balanced transmission line a pair of lines carry equal current signals that are 180° out of phase. Twisted wire pairs are typically used for balanced transmission lines. In an unbalanced transmission line, such as a coaxial cable, the currents in the two conductors are unbalanced with respect to a symmetrical ground plane.

Such baluns are often produced by winding a coil of fine bifiler wire (e.g. #34 or #36 wire) or fine coaxial cable around a small toroidal or rod-shaped core of ferrite. The performance of this form of balun is highly dependent on the position of the wires with respect to each other and with respect to the core, so that additional tuning and rework are usually required. For such wound baluns, insertion loss is typically approximately 0.8 dB at 900 MHz due to losses in the ferrite core and in the fine wire that is used. Excessive insertion loss can result in reduced efficiency and higher distortion levels when the balun is used with push-pull amplifiers Alternately, baluns may be produced using cylindrical ferrite beads having single axial holes through which bifiler wire or bare coaxial cable is threaded. The length of the wire should be less than approximately –/4 at the highest frequency of operation, and the number of beads should be sufficient to provide adequate low frequency performance. Ferrite beads for such application is described in "Ferrite Beads, Balun and Broadband Core", in Power Conversion International, Vol. 6, No. 4, pp. 44–50, July–August 1980. An example of a beaded balun is described in "Transforming the Balun" by John S. Belrose in QST, June 1991, pp. 30–33. That citation describes a balun with 50 beads of 73 ferrite (e.g. Amidon No. FB-73-2401) threaded over a 12 inch portion of Teflon dielectric coaxial cable for use from 1.8 to 30 MHz.

A typical application for such baluns is in push-pull operation of a linear amplifier in a broadband network. In such an amplifier, the power of the signal in both lines of a balanced transmission line is amplified. "Broadband Transformer Design for RF Transistor Power Amplifiers" by Octavius Pitzalis Jr. and Thoman Couse in ECOM-2989, pp. 207–216, U.S. Army Electronics Command, Fort Monmouth, N.J., July 1986, describes such an amplifier. A first balun converts an unbalanced signal in a coaxial cable into a balanced signal in a balanced transmission line pair, then the balanced signal is amplified by several amplifier stages, and then a second balun converts the balanced signal into an unbalanced signal for transmission through another coaxial cable. In modern wideband GaAs FET linear amplifiers, the frequency response is often limited by the baluns that are used.

U.S. Pat. No. 5,808,518 to McKinzie, III et. al. describes a 4:1 balun for use with signal frequencies between 100 MHz and 10 GHz. In that citation, a circuit board has a window and two narrow elongate cantilever portions of the circuit board extend from a first side of the window. The cantilever portions carry straight printed sections of a U-shaped conductor of the circuit board. Four beads are threaded over each of the cantilever portions, and wires are connected from the free ends of the cantilever portions to the circuit board at a second side of the window to form the balun. U.S. Pat. No. 5,379,006 describes baluns formed by threading beads over coaxial cable for use in ultra wide band (e.g. DC to GHz) transmission. That balun is supported by a circuit board with a window through which a portion of the balun extends onto the other side of the circuit board. U.S. Pat. No. 5,742,205 to Cowen et. al. describes FET CATV line amplifiers that utilize input and output baluns.

Transmission line transformer theory and example designs are described in "Transmission Line Transformers", 1st edition, by Jerry Sevick, Amateur Radio Relay League, Newington Conn., 1987; and in "Building and Using Baluns and Ununs" by Jerry Sevick, from CQ Communications Inc, Hicksville, N.Y., 1994.

All of the above citations are hereby incorporated herein in whole by reference.

SUMMARY OF THE INVENTION

It is an object of the invention to provide a 1:1 balun for high performance broadband applications (i.e. in a frequency range from 45 MHz to 1005 MHz).

It is an object of the invention to provide such a balun with performance that insensitive to manufacturing tolerances in the position of the wires with respect to each other or with respect to the ferrite cores, so that additional tuning and rework is minimized and automated manufacturing of the balun is easily achievable.

It is an object of the invention to provide such a balun in which the input terminals are proximate to the output terminals of the balun for compact circuitry.

It is an object of the invention to provide such a balun that is lightweight and compact.

It is an object of the invention to provide such a balun that can be easily and securely mounted on a circuit board in automated manner.

It is an object of the invention to provide a linear amplifier circuit for push-pull operation in such broadband applications that utilizes such baluns for input and output.

It is an object of the invention to provide such a balun with low insertion power loss (e.g. less than approximately 0.2 dB at 900 MHz);

It is an object of the invention to provide such a balun with low return loss (e.g. approximately 20 dB minimum from 45 to 1005 MHz); and In the invention, a balun is constructed from a transmission line pair that are bent to form a U-shape including two less curved (straight leg) sections connected at one end by a more curved (bent) section. Single hole ferrite beads are threaded over the less curved sections of the lines. This balun is simple, very compact, and easily adapted for automatic manufacture. Since the input and output of the balun are proximate, the design of circuitry utilizing the balun is simplified. The balun provides high quality signal processing and is useful for high performance broadband push-pull amplifiers in CATV distribution systems especially for signal amplification prior to laser transmission.

The invention includes a high-performance compact push-pull amplifier for use in broadband networks. The compact amplifier includes an input balun for converting an unbalanced signal in a single line into balanced signals in a balanced transmission line pair. A cascade of amplifier stages, in each conductor of the transmission line, amplifies the input signal. An output balun converts the amplified balanced signals in the balanced pair of conductors of the transmission line into an unbalanced signal in a single output line.

The invention also includes a CATV distribution network in which the compact high-performance push-pull amplifier of the invention is used in the head-end and nodes of the network for amplification of the feed to a laser diode transmitter. This provides high quality optical signals in the forward and return directions in the network.

Those skilled in the art can understand the invention and additional objects and advantages of the invention by studying the description of preferred embodiments below with reference to the following drawings that illustrate the features of the appended claims:

DETAILED DESCRIPTION OF THE PREFERRED EMBODIMENTS

Figure 1:
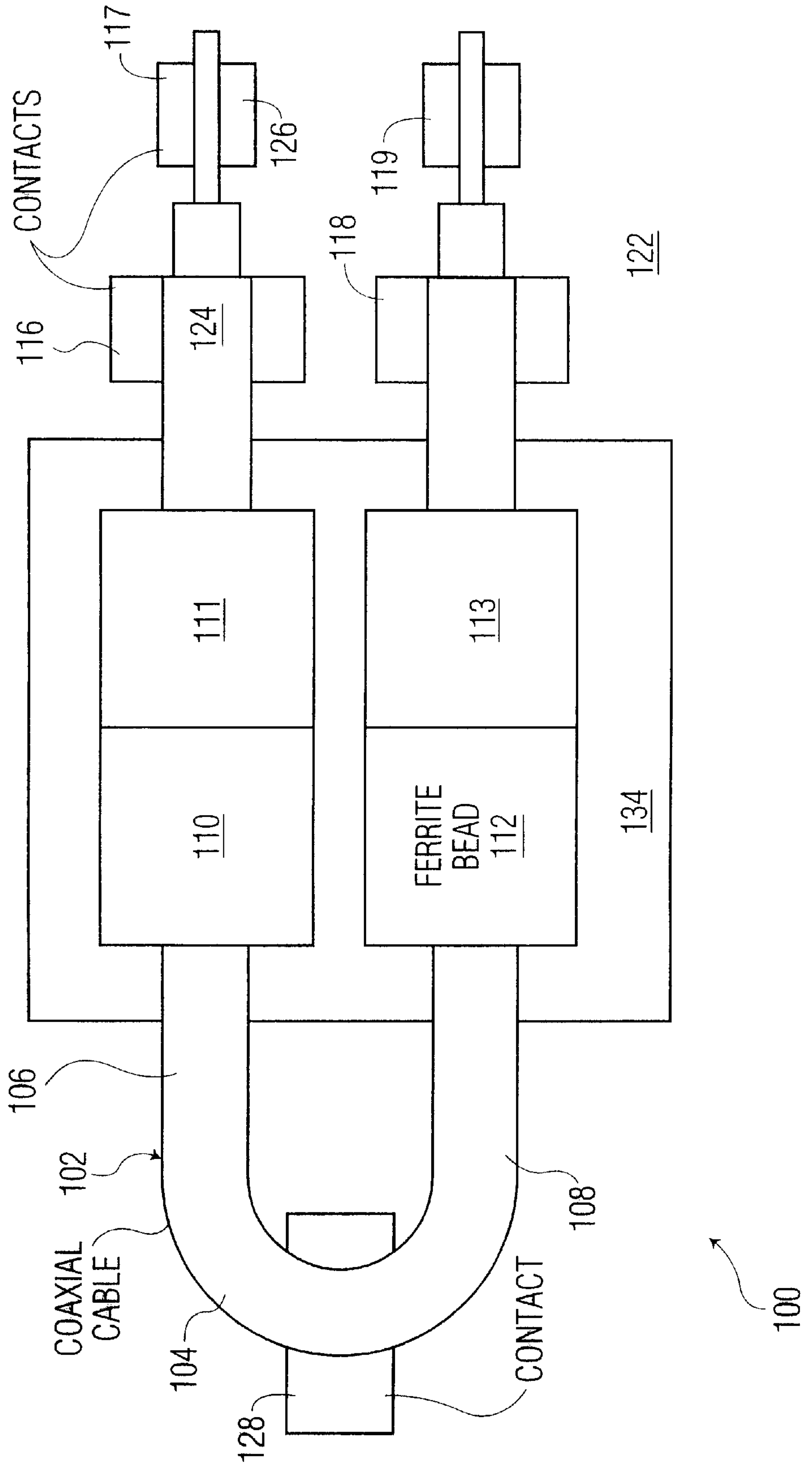
FIG. 1 shows a specific embodiment of the balun of the invention using a coaxial cable and positioned for attachment on a circuit board.

FIG. 1 illustrates relevant portions of a specific embodiment 100 of the compact balun of the invention. A transmission line 102 is bent into a U-Shape with a curve 104 and straight legs 106 and 108 extending from the curve. The transmission line may be bifiler wire or a twisted pair of wires, but preferably the wires are a semi-rigid bare coaxial cable which has an intrinsic impedance of 75 Σ, is about 2.5 mm thick, and has Teflon insulation between the inner and outer conductors. Ferrite beads 110–113 are threaded over each of the legs 106, 108 of the coaxial cable. Preferably, there are 1 to 4 beads on each leg, more preferably 2 beads on each leg. The beads are approximately 4 to 8 mm long and preferably about 6 mm long; and the beads are 4 to 8 mm in diameter and preferably 5 mm in diameter. The ferrite may be No. 61 or 65 material and such beads are well known and available, for example, from Fair-Rite Products Corp., Wallkill N.Y. The radius of the curved section may be 3 to 8 mm and the legs may be 10 to 30 mm long. The ends of the legs that are remote from connecting bend 104, are positioned on contacts 116–119 of circuit board 122. More specifically, for leg 106, end 124 of the outer conductor of the coaxial cable is positioned over conductive pad 116, and end 126 of the inner conductor of the coaxial cable is positioned over conductive pad 117. Also, curve 104 is positioned over contact pad 128. Fiberglass epoxy circuit boards with copper wiring layers and methods for their manufacture are well known in the art.

Contact pads 116–119 are interconnected, for example, to micro-strips 130–13 or plated through holes of the circuit board in FIG. 2 described below. The microstrips may be, for example, conductors of the circuits shown in FIGS. 3 and 4. Contact 123 is isolated and is only used for structural support, that is, it is not connected to any other circuit board wiring. The circuit board has a window 134 through the thickness of the circuit board and into which the bottom parts of beads 110–113 extend, as shown, to reduce the profile of the balun over the surface of the circuit board and to hold the beads in place on the transmission line legs.

Figure 2:
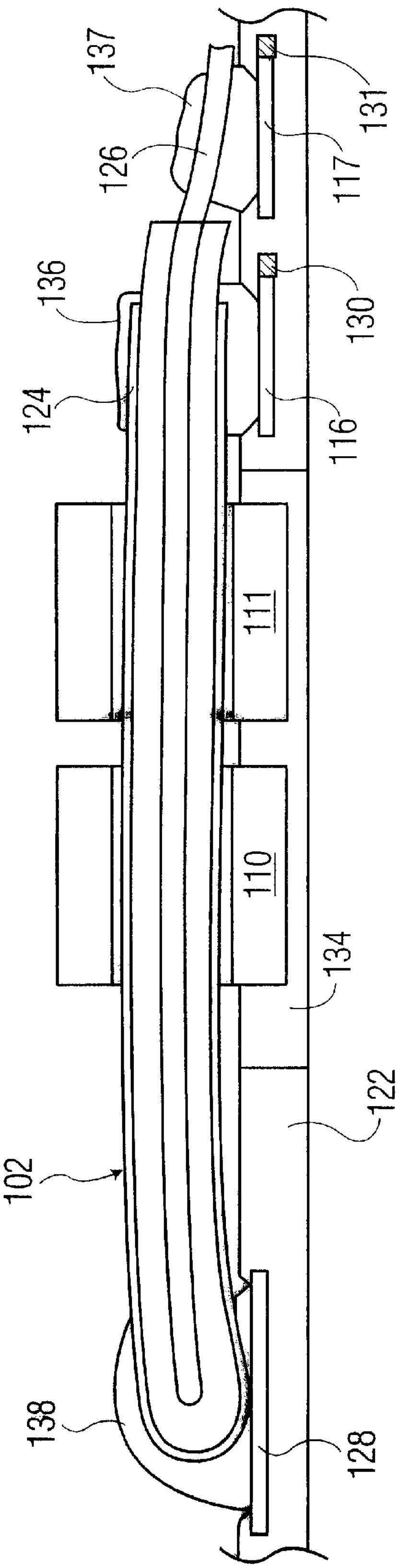
FIG. 2 is a section of the embodiment of FIG. 1 following the center of the coaxial cable after attachment to the circuit board.

FIG. 2 is a section of the balun of FIG. 1 sliced through the central axis of the coaxial cable from the center of pad 128 to end 126 of leg 106, after the balun has been connected to the circuit board. Material 136 connects end 124 of the outer conductor of coaxial cable 102 to pad 116, material 137 connects end 126 of the inner conductor of the coaxial cable to pad 117, and material 138 connects the outer conductor at the U-bend 104 to contact 128. The material may be conductive adhesive or more preferably, solder alloy such as Sn-Pb solder.

Figure 3:
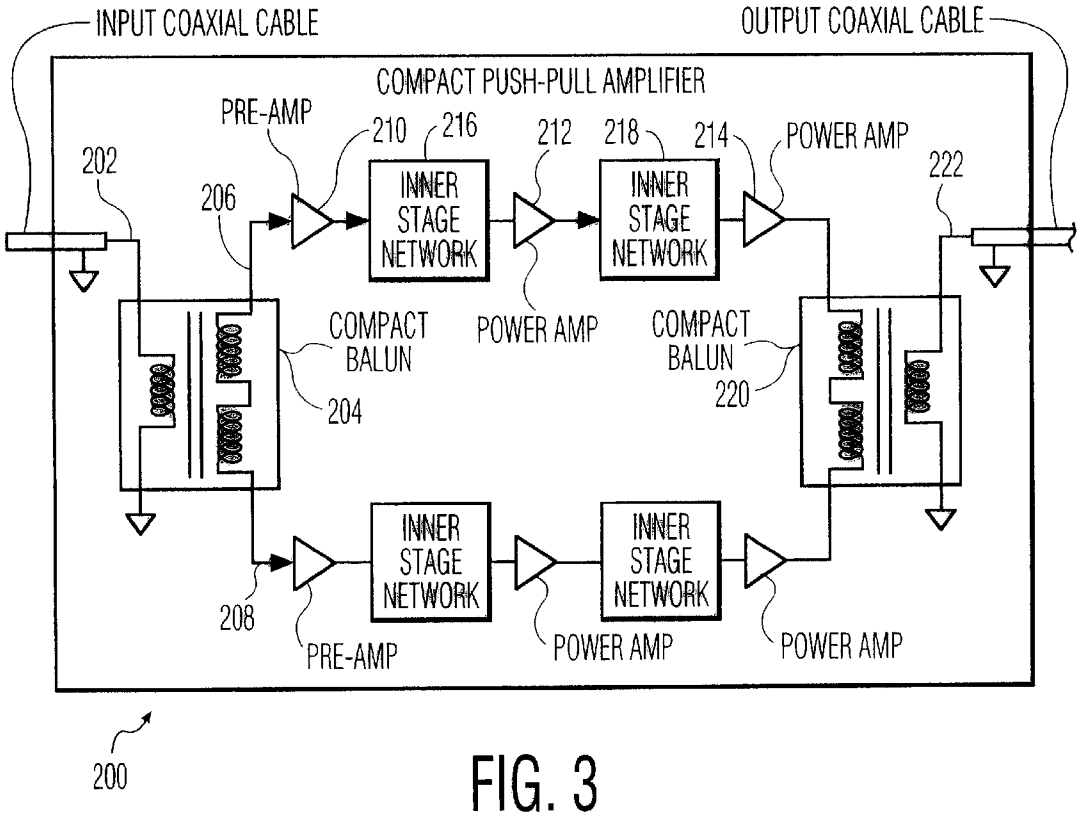
FIG. 3 schematically illustrates a compact push-pull amplifier of the invention utilizing the balun of FIGS. 1 and 2.

FIG. 3 illustrates relevant portions of compact push-pull amplifier 200 of the invention. An input signal is provided to the amplifier from single signal line 202. Compact balun 204 converts the signal into a balanced signal in a balanced transmission line 206, 208. Each conductor of the transmission line includes a similar cascade of amplifier stages 210, 212, 214. Also, interstage network (e.g. compensators, equalizers, phase shifters, and/or predistorters) 216 and 218 may be provided between each amplifier stage to remove distortions caused by the amplifiers. After the signal has been amplified, second compact balun 220 converts the balanced output signal in transmission line conductors 206 and 208 into an unbalanced output signal in output line 222. Preferably, the amplifiers utilize Gallium Arsenide Field Effect Transistor (GaAs FET) technology as described in U.S. Pat. No. 5,742,205 to Cowen discussed above.

This compact high-performance push-pull amplifier of the invention is capable of providing high power amplification with very low distortion, which is especially useful in amplification of signals immediately prior to laser transmission.

Figure 4:
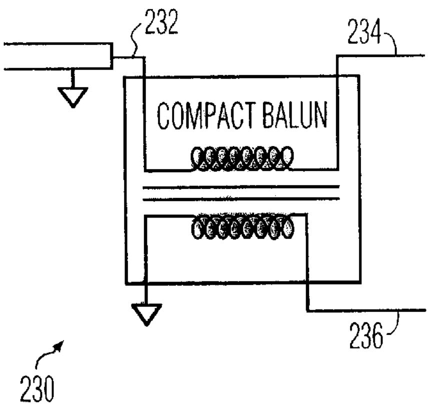
FIG. 4 schematically illustrates an alternate connection of the balun of FIG. 1 for use in the push-pull amplifier of FIG. 3.

FIG. 4 illustrates another embodiment 230 of the compact balun of the invention. The balun converts between an unbalanced signal in single line 232 and a balanced signal in a balanced transmission line pair 234, 236. Either or both of baluns 204 and 220 in FIG. 3 can be replaced by balun 230 of FIG. 4.

Figure 5:
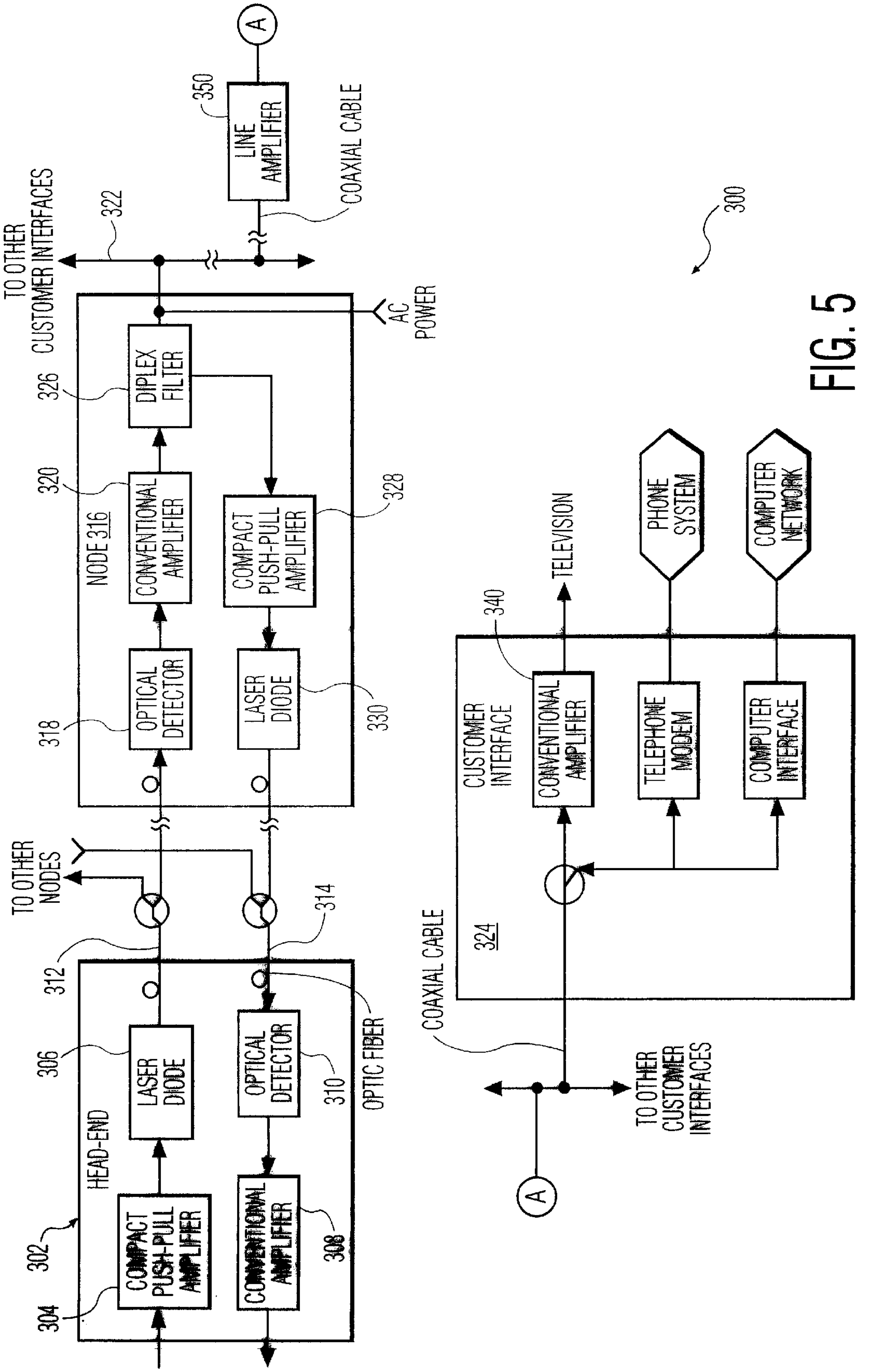
FIG. 5 is a block diagram schematically illustrating a CATV distribution system using the compact push-pull amplifier of the invention.
Figure 6:
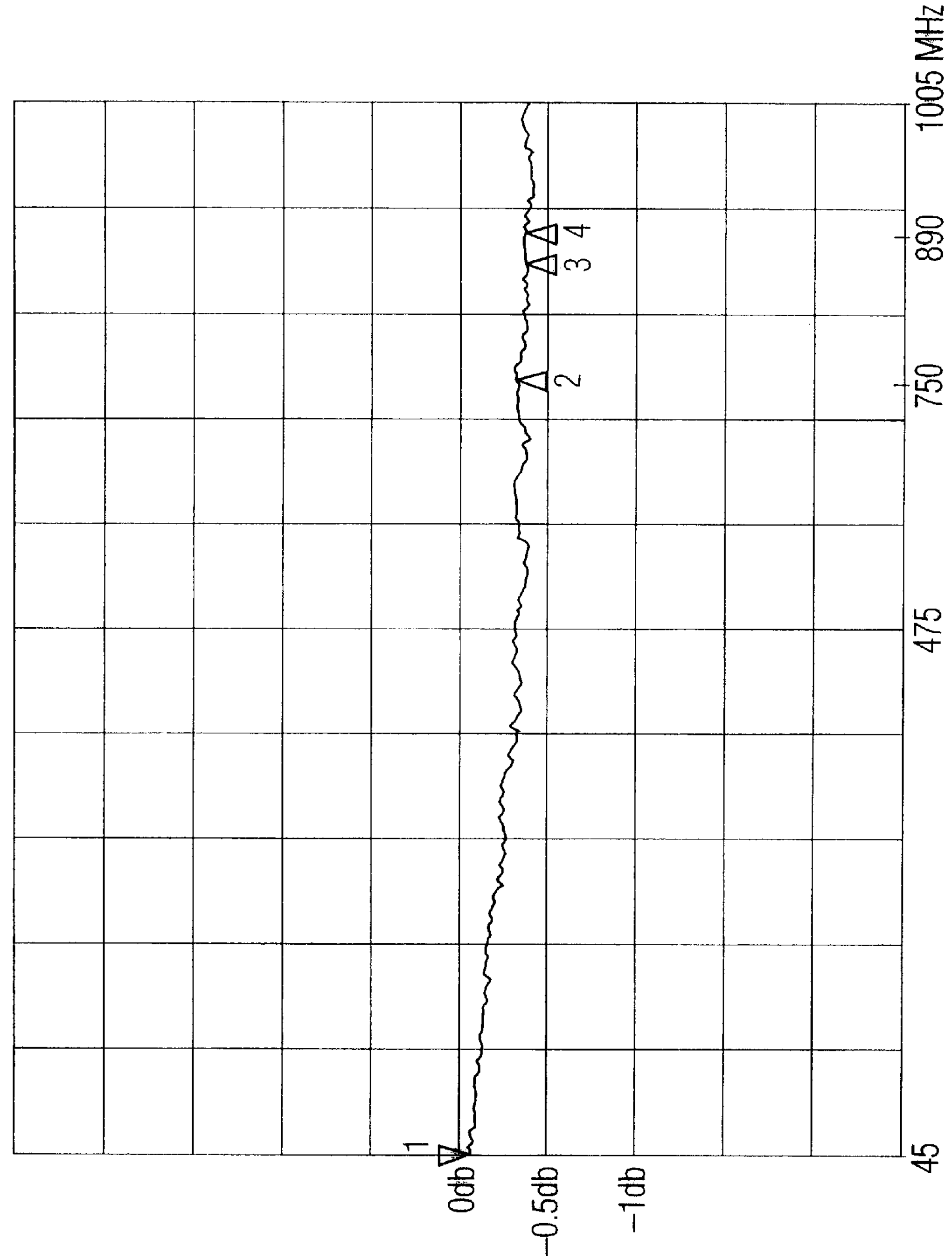
FIG. 6 shows the measured insertion loss for back-to-back coaxial baluns of FIG. 1 from 45 to 1005 MHz.
Figure 7:
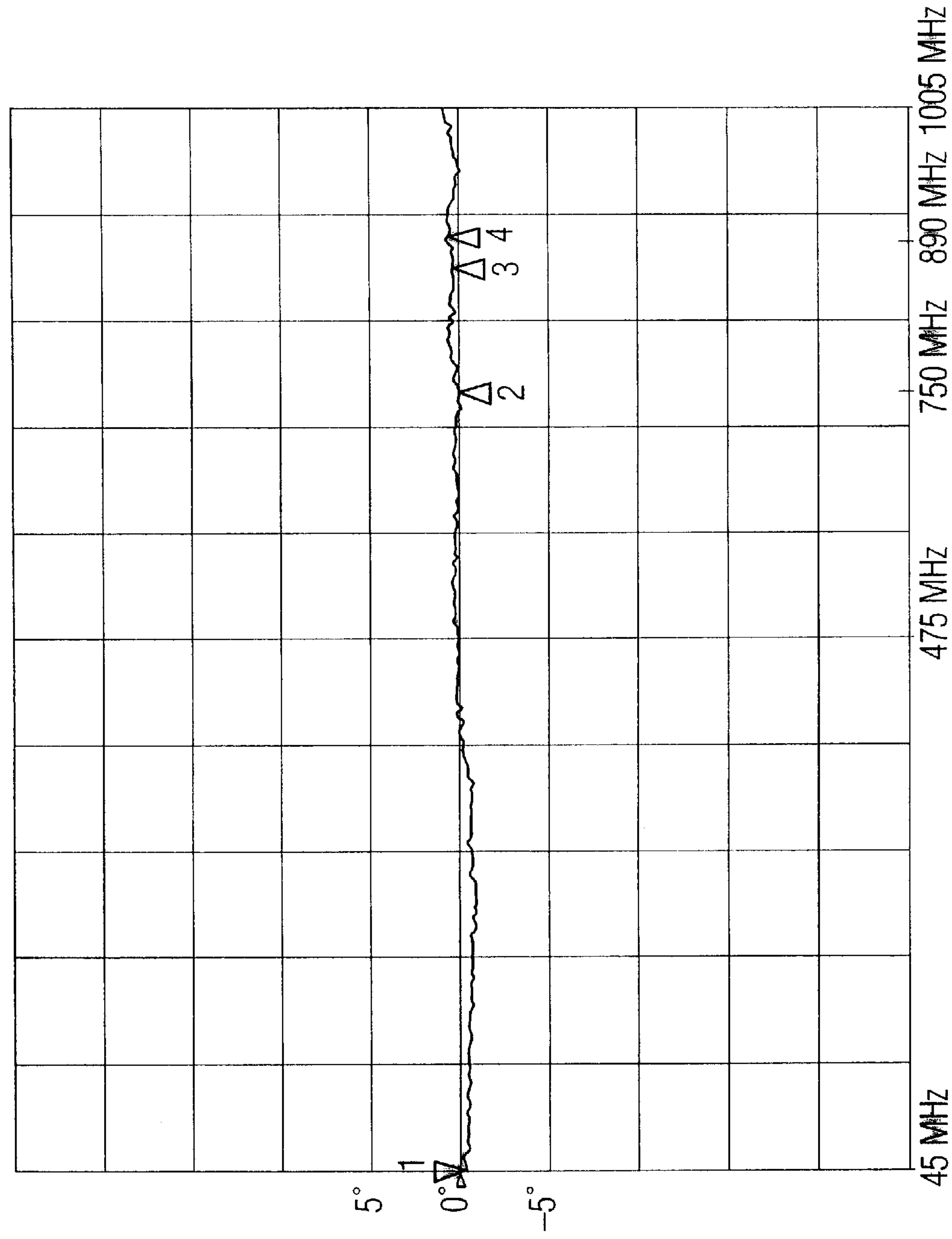
FIG. 7 shows the measured phase linearity for back-to-back coaxial baluns of FIG. 1 from 45 to 1005 MHz.
Figure 8:
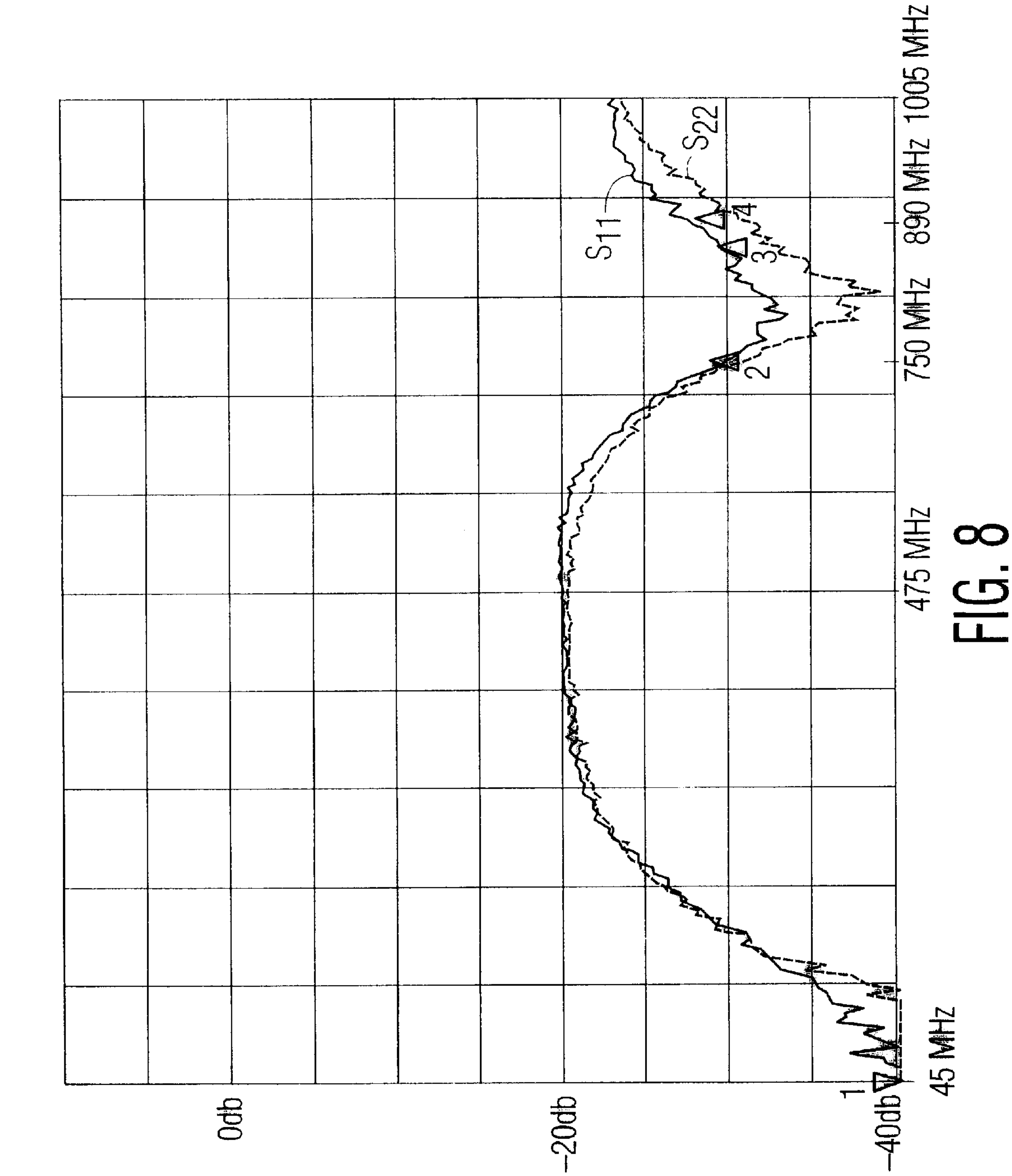
FIG. 8 shows the measured input return and output return losses for back-to-back coaxial baluns of FIG. 1 from 45 to 1005 MHz.
Figure 9:
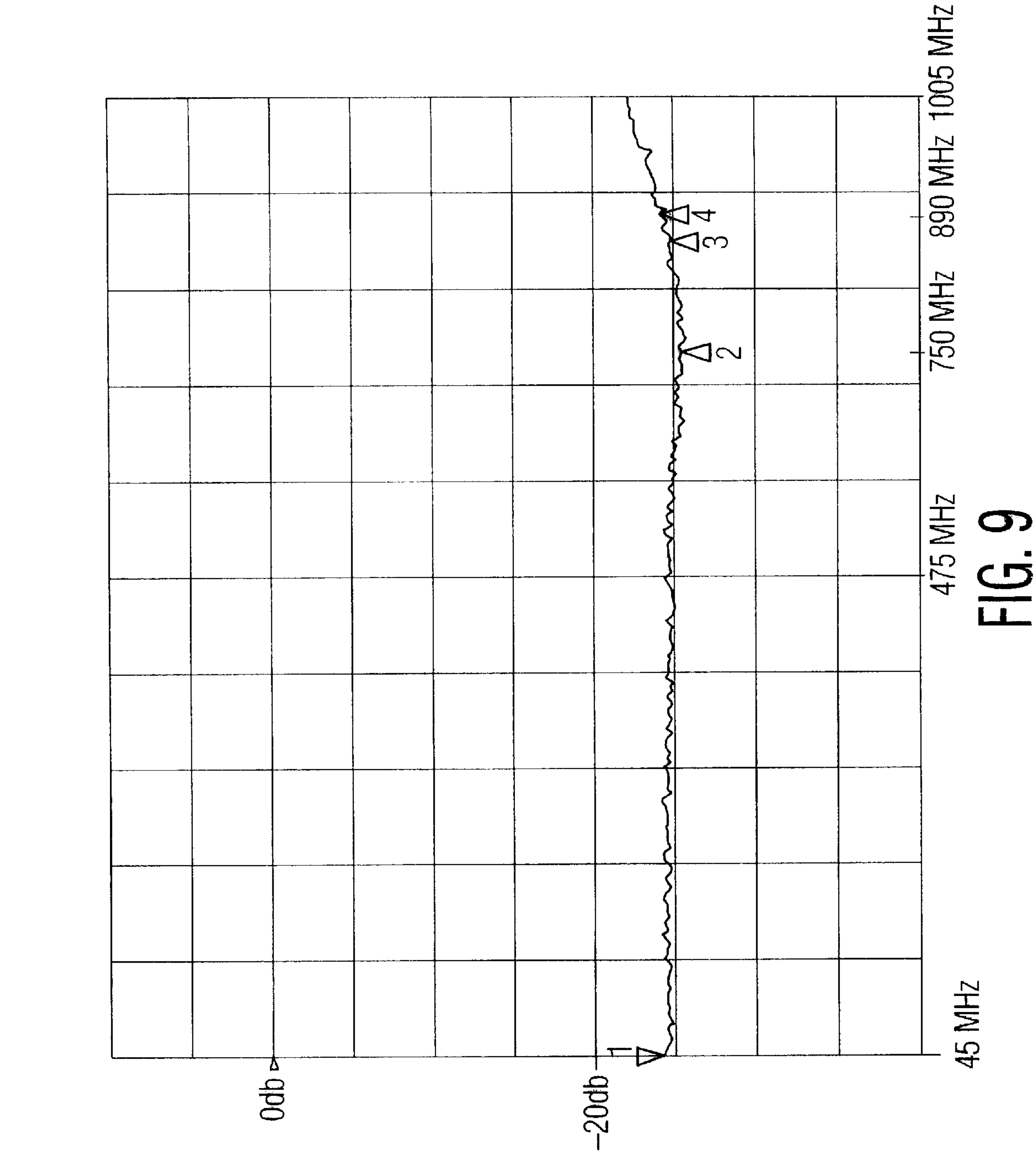
FIG. 9 shows the measured input return loss for the coaxial baluns of FIG. 1 from 45 to 1005 MHz.

FIG. 5 illustrates relevant portions of CATV distribution system 300 using the compact push-pull amplifiers of the invention. A head-end 302 includes first compact push-pull amplifier 304 of the invention herein, to amplify a forward signal prior to laser diode 306 converting the electronic forward signal to an optical forward signal. The head-end also includes second compact push-pull amplifier 308 that amplifies a return signal after optical detector 310 converts an optical return signal to the electronic return signal.

Optical cable 312 conducts the optical forward signal from head end 302 to a plurality of nodes, only node 316 of which is shown. Also, optical cable 314 conducts optical return signals from the nodes back to the head end.

The node includes optical detector 318 to convert the optical forward signal into an electronic forward signal and conventional amplifier 320 to amplify the forward signal. The forward signal is provided to a coaxial cable network 322 which distributes the forward signal to a multitude of customer interfaces, such as at 324. A return signal from the customer interfaces is separated from the forward signal in the coaxial cable network by diplex filter 326 of node 316. The node also includes compact push-pull amplifier 328 of the invention herein, for amplifying the return signal before laser diode 330 converts the return signal from an electronic signal to an optical signal for transmission through optical fiber 314.

Customer interface 324 includes compact push-pull amplifier 340 for amplifying a television signal sufficient for distribution into the customer's video equipment (not shown). The customer interface also includes interface equipment for producing return signals such as a telephone modem 342 for bi-directional telephone communications and computer modem 344 for bi-directional computer communications through the CATV system.

Line amplifiers, such as at 350, are required to extend the range of the forward and return electronic signals through coaxial cable network 322 between the node and respective customer interfaces. Depending on the distance of the distribution path between the node and the customer interface, some distribution paths may not require any line amplifiers while other distribution paths may require several line amplifiers.

FIGS. 6–9 show measured test data for the balun shown in FIG. 1.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

I claim:

1. A compact balun comprising:

a transmission line of two conductors bent to form a U-shape including a more curved section with two ends each connected to a respective less curved section;

a respective terminal at a terminal end of each less curved section, the terminal ends being remote from the connection to the more curved section, wherein each respective terminal includes a plurality of contacts each of which connects to one of the two conductors; and one or more cylindrical ferrite beads, each with an axial hole through which a respective less curved section of the transmission line extends, wherein: the conductors of the transmission line are separated by a dielectric material;

the dielectric material is Teflon;

the transmission line is a coaxial cable;

the coaxial cable does not have an outer covering;

the coaxial cable is semi-rigid, has characteristic impedance of 75 ohms, and is approximately 2.5 mm in diameter;

the more curved section has a radius of approximately 3 to 6 mm;

the radius of the more curved section is approximately 4 mm;

the length of the less curved sections between the connections to the curved section and the closest terminal of one of the wires are approximately 15 to 30 mm long;

there are two beads on each less curved section of the pair of transmission lines;

the beads are approximately 4 to 8 mm long and approximately 4 to 6 mm in diameter;

the beads are approximately 6 mm long and approximately 5 mm in diameter;

the beads on the same less curved section are approximately in contact;

the terminals include a section of coaxial cable 1–3 mm long, a section of inner conductor covered with dielectric material that is 1 to 3 mm long, and a section of inner conductor 1 to 8 mm long;

the insertion loss of the balun is less than 0.5 dB at 900 MHz;

the insertion loss of the balun is approximately 0.2 dB at 900 MHz;

the return loss is less than 30 dB;

the return loss being approximately 20 dB; and the balun has a substantially flat response for signal transmission frequencies between 5 and 1005 MHz.

2. A circuit comprising:

a circuit board with two conductive pads for a balanced transmission line pair and two conductive pads for an unbalanced transmission line pair;

a transmission line of two conductors, bent to form a U-shape and including a more curved section with two ends each connected to a respective less curved section of the transmission line;

one or more cylindrical ferrite beads, each with an axial hole through the conductors of the less curved sections of the transmission line extend; and a respective terminal at an end of each less curved section of the line, which is remote from the connection of the more curved section of the line, each conductor of the line being connected between a different conductive pad for the balanced transmission line pair and a different conductive pad of the unbalanced transmission pair, wherein: a window through the circuit board on one side of which the terminals are connected to the four conductive pads, across which the less curved sections of the wires extend, and into which the beads protrude whereby the profile of the circuit is reduced and the beads are positioned together;

the transmission line consists of bare coaxial cable with Teflon dielectric separating the conductors over which the beads are threaded;

the connections between the terminals at the end of each less curved section and the conductive pads on the circuit board, include: a first connection in which an end section 1–3 mm long of the bare outer conductor of the coaxial cable at the end of the outer conductor of the coaxial cable is soldered to a first conductive pad; a section of inner conductor covered with dielectric material that extends 1–6 mm from the first connection, and a second connection in which a section of bare inner conductor 1–8 mm long is soldered to a second conductive pad of the circuit board;

the connections between the terminals of the less curved sections and the conductive pads of the circuit board approximately form a rectangle to provide support to one side of the U-shaped balun; and the outer conductor of the coaxial cable is soldered to an isolated metal pad at the opposite side of the window from the side at which the less curved sections are attached to the circuit board whereby the transmission line is supported.

3. A compact broadband amplifier for amplifying an electronic signal, comprising:

an input balun for converting an unbalance signal in a single wire to a balanced signal in a pair of conductors of a balanced transmission line;

a push-pull amplifier configuration including a cascade of amplifier stages in each conductor of the transmission line, the amplifier stages of each conductor including a pre-amp and a power amp;

an output balun for converting the balanced signal in the transmission line to an unbalanced signal in a single output line;

each balun, including a transmission line of two conductors bent to form a U-shape including a more curved section with two ends each connected to a respective less curved section the transmission line of the balun;

a respective terminal at a terminal end of each less curved section, the terminal end being remote from the connection to the more curved section; and two or more cylindrical ferrite beads, each with an axial hole, threaded over a respective less curved section of the transmission line of the balun.

4. The broadband amplifier of claims 5 in which:

an interstage network is provided between the amplifier stages in each cascade of amplifiers for reducing distortions.

5. A broadband communication system, comprising:

a head end including:

a first high-performance amplifier for amplifying a electronic forward signal;

a laser for transmitting the amplified electronic forward signal as a optical forward signal;

an optical receiver for receiving a optical return signal as an electronic return signal;

an amplifier for amplifying the electronic return signal;

a plurality of nodes, each including:

an optical receiver for receiving the optical forward signal as an electronic forward signal;

an amplifier for amplifying the electronic forward signal;

a second high-performance amplifier for amplifying the electronic return signal;

a laser transmitter for transmitting the amplified electronic return signal as an optical return signal;

a diplex filter for separating the return electronic signal from the forward electronic signal;

a plurality of optical fibers for transporting the forward optical signal and the return optical signal between the head end and the nodes;

a plurality of user interface units for receiving the electronic forward signal and for providing the electronic return signal;

a plurality of coaxial cables for transporting the electronic forward and return signals between the nodes and the customer interface units;

the high-performance amplifiers, each including:

an input balun for converting an unbalance transmission in a single transmission line to a balanced transmission in a balanced transmission line;

a push-pull amplifier configuration including a multitude of cascade amplifier stages in each conductor of the balanced transmission line, the amplifier stages in each conductor including a pre-amp and a power amp; and an output balun for converting the balance transmission to an unbalanced transmission in a single transmission line;

each balun, including:

a transmission line bent to form a U-shape including a more curved section with two ends each connected to a respective less curved section of the line;

a respective terminal at a terminal end of each less curved section of each conductor of the transmission line, the terminal end being remote from the connection to the more curved section; and one or more cylindrical ferrite beads for each respective less curved section, each with an axial hole through which the respective less curved section extends.

* * * * *